US009020748B2

(12) United States Patent
Olivier et al.

(10) Patent No.: US 9,020,748 B2
(45) Date of Patent: Apr. 28, 2015

(54) SCHEDULER FOR MONITORING OBJECTS ORBITING EARTH USING SATELLITE-BASED TELESCOPES

(75) Inventors: Scot S. Olivier, Livermore, CA (US); Alexander J. Pertica, Livermore, CA (US); Vincent J. Riot, Oakland, CA (US); Willem H. De Vries, Livermore, CA (US); Brian J. Bauman, Livermore, CA (US); Sergei Nikolaev, Sacramento, CA (US); John R. Henderson, Castro Valley, CA (US); Donald W. Phillion, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 13/559,449

(22) Filed: Jul. 26, 2012

(65) Prior Publication Data

US 2013/0275036 A1    Oct. 17, 2013

Related U.S. Application Data

(60) Provisional application No. 61/511,940, filed on Jul. 26, 2011.

(51) Int. Cl.
| G08G 5/04 | (2006.01) |
| B64G 1/10 | (2006.01) |
| B64G 1/24 | (2006.01) |
| B64G 3/00 | (2006.01) |
| B64G 1/36 | (2006.01) |

(52) U.S. Cl.
CPC .............. *B64G 1/242* (2013.01); *B64G 1/1085* (2013.01); *B64G 1/36* (2013.01); *B64G 3/00* (2013.01)

(58) Field of Classification Search
USPC .................. 701/3–5, 13, 300–302, 531, 468; 244/158.1, 158.6, 164, 171, 172.4; 318/580, 584–586; 455/12.1
See application file for complete search history.

(56) References Cited

U.S. PATENT DOCUMENTS

| 5,548,515 | A | * | 8/1996 | Pilley et al. .................... 701/120 |
| 5,899,945 | A | * | 5/1999 | Baylocq et al. .................... 701/4 |

(Continued)

OTHER PUBLICATIONS

Henderson, J.R. et al., "Intelligent Sensor Tasking for Space Collision Mitigation," *Proc. of SPIE* 7691:76910L-1-76910L-12, 2010.

(Continued)

*Primary Examiner* — Mary Cheung
*Assistant Examiner* — Rodney Butler
(74) *Attorney, Agent, or Firm* — Perkins Coie LLP (57) ABSTRACT

An ephemeris refinement system includes satellites with imaging devices in earth orbit to make observations of space-based objects ("target objects") and a ground-based controller that controls the scheduling of the satellites to make the observations of the target objects and refines orbital models of the target objects. The ground-based controller determines when the target objects of interest will be near enough to a satellite for that satellite to collect an image of the target object based on an initial orbital model for the target objects. The ground-based controller directs the schedules to be uploaded to the satellites, and the satellites make observations as scheduled and download the observations to the ground-based controller. The ground-based controller then refines the initial orbital models of the target objects based on the locations of the target objects that are derived from the observations.

22 Claims, 8 Drawing Sheets

(56) References Cited

U.S. PATENT DOCUMENTS

| | | | |
|---|---|---|---|
| 6,133,997 | A | 10/2000 | Yamawaki et al. |
| 6,154,691 | A * | 11/2000 | Bailey ............................. 701/13 |
| 6,233,507 | B1 * | 5/2001 | May ................................ 701/13 |
| 6,757,612 | B1 | 6/2004 | Talent et al. |
| 7,542,829 | B2 | 6/2009 | Lee et al. |
| 7,925,167 | B1 | 4/2011 | Kozubal et al. |
| 2004/0024528 | A1 * | 2/2004 | Patera et al. ................. 701/301 |
| 2005/0083412 | A1 * | 4/2005 | Murphy .................... 348/211.2 |
| 2006/0179456 | A1 * | 8/2006 | Toyoshima et al. ............. 725/68 |
| 2007/0032984 | A1 * | 2/2007 | Alfano ......................... 702/181 |
| 2008/0081556 | A1 | 4/2008 | Robinson |
| 2010/0140413 | A1 | 6/2010 | Bailey |
| 2010/0250137 | A1 * | 9/2010 | Hoots .......................... 701/301 |
| 2011/0025554 | A1 | 2/2011 | Bailey |
| 2011/0221751 | A1 | 9/2011 | Kelly et al. |
| 2011/0226907 | A1 * | 9/2011 | Robinson ................... 244/158.4 |
| 2012/0029812 | A1 * | 2/2012 | Altwaijry et al. ............. 701/226 |
| 2012/0072990 | A1 * | 3/2012 | Gutt et al. ....................... 726/25 |
| 2012/0085869 | A1 * | 4/2012 | Lloyd ........................ 244/158.6 |
| 2013/0124079 | A1 | 5/2013 | Olivier et al. |

OTHER PUBLICATIONS

Simms, L. et al., "Optical Payload for the STARE Mission," *SPIE Defense and Security Conference*, Orlando, Florida, Apr. 25, 2011-Apr. 29, 2011.

* cited by examiner

SCHEDULER FOR MONITORING OBJECTS ORBITING EARTH USING SATELLITE-BASED TELESCOPES

CROSS-REFERENCE TO RELATED APPLICATION(S)

This application claims the benefit of U.S. Provisional Patent Application No. 61/511,940 filed Jul. 26, 2011, entitled SPACE-BASED TELESCOPES FOR ACTIONABLE REFINEMENT OF EPHEMERIS (STARE), which is incorporated herein by reference in its entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Thousands of satellites have been launched into earth orbit with nearly 1,000 of them still active and providing valuable services such as military and intelligence data collection, global positioning, telecommunications, weather and climate monitoring, and so on. These active satellites, however, are increasingly at risk of colliding with "space junk." Space junk ("junk objects") is the collection of now-useless, human-created objects in earth orbit such as spent rocket stages, defunct satellites, lost astronaut tools, and fragments from collisions. The risk of a collision occurring is more than a theoretical possibility as in February 2009 a collision occurred between an American Iridium satellite and a defunct Russian Cosmos satellite.

The risk of future collisions occurring is increasing because the density of objects in earth orbit is increasing. Although space junk will eventually be removed from orbit by the frictional forces of the earth's atmosphere, space junk can remain in orbit a very long time as those frictional forces are small. Space objects (e.g., active satellites and space junk) of certain types tend to orbit in certain orbital regions. For example, low-earth orbit (i.e., 160 km to 2,000 km) tends to contain space stations, upper rocket stages, and amateur satellites; middle-earth orbit (2,000 km to 35,876 km) contains navigation satellites; and the orbit at 36,000 km contains geostationary satellites. A critical density occurs when space objects enter orbit faster than space objects leave orbit. Eventually, some orbital regions may become so crowded that placing new satellites in orbit will be impractical as the risk of a collision will be too high.

Estimates place the number of junk objects at tens of millions. The vast majority of the junk objects are very small particles such as dust from solid rocket motors or paint that flakes off of satellites. A collision between an active satellite and such small junk objects can have an erosive effect, similar to sandblasting, on the satellite. Estimates place the number of junk objects in low-earth orbit that are larger than 1 cm to be around 300,000. A collision between an active satellite and such junk objects can have a more serious effect, but not necessarily a catastrophic effect. A significant number of junk objects, however, are larger than 10 cm, and a collision between an active satellite and such large space junk can indeed be catastrophic. The only way to avoid an impending collision with large space junk is to maneuver the satellite away from the space junk.

If a collision between an active satellite and large space junk were to occur, the result might be hundreds of fragments, some of which could be larger than a softball. The collision between the Iridium satellite and the Cosmos satellite produced thousands of junk objects that are still in orbit. Actions taken by certain countries have resulted in significantly increasing the amount of space junk. In 2007, China performed an anti-satellite weapons test that destroyed an aging weather satellite using a kill vehicle launched on board a ballistic missile. The destruction of the weather satellite created 2,000 baseball-sized or larger junk objects that could destroy a satellite and over 2 million junk objects that could cause damage to a satellite.

To help predict collisions so that evasive actions can be taken, the U.S. Joint Space Operations Center ("JSpOC") gathers ground-based observations of space junk. The primary source of these observations is the Space Surveillance Network, which is a global network of sensors (29 optical telescopes and radars) operated by the U.S. Air Force. The Space Surveillance Network follows some 20,000 space objects the size of a baseball or larger, which can destroy a satellite.

Every day the JSpOC makes observations of space objects via its sensors, generates orbital models for the observed space objects, and makes collision predictions based on those orbital models. The observations for a space object that are collected over time are used to generate the orbital models. The day before making the observations, the list of space objects to be observed is prioritized giving manned satellites (e.g., the International Space Station) priority, followed by military and intelligence satellites, and so on. The JSpOC determines how many tracks are needed to determine the orbit of each space object in the list based primarily on the type and size of the space object and the change rate of its orbit. The sensors are then programmed to make the required observations of the space objects.

After the observations for a day are collected, the JSpOC collects the observations, generates orbital models for the space objects, and predicts what space object might collide in typically a 72- to 96-hour window. Satellite operators can use these predictions to maneuver their satellites to avoid the collision.

Unfortunately, the accuracy of the orbital models is insufficient to make collision predictions with an acceptable degree of certainty. A typical collision prediction may be based on the space objects passing within 1 km of each other. If satellite operators maneuver their satellites based on every such prediction, the satellites would quickly use up the available fuel needed to maintain their orbits. At an accuracy level of 1 km, the Iridium satellite constellation of 90 satellites providing voice and data to phones, pagers, and transceivers would be warned to move 10 satellites per day on average. As a result these warnings are typically ignored, with sometimes catastrophic results.

It would be desirable to have a system that would provide more accurate collision predictions for space objects and provide them in enough time so that space operators could take action to maneuver an active satellite to avoid the collision.

DETAILED DESCRIPTION

A method and system for monitoring space-based objects to refine the ephemeris of the space-based objects is provided. In some embodiments, an ephemeris refinement system includes satellites with imaging devices (e.g., telescopes) in earth orbit to make observations of space-based objects ("target objects") and a ground-based controller that controls the scheduling of the satellites to make the observations of the target objects and then refines the orbital models of the target objects. The ground-based controller determines when the target objects will be near enough to a satellite for that satellite to collect an image of a target object based on an initial orbital model for that target object. The ground-based controller directs the schedules to be uploaded to the satellites, and the satellites make observations as scheduled and download the observations to the ground-based controller. The ground-based controller then refines the initial orbital models of target objects based on locations of the target objects that are derived from the observations and generates refined ephemerides from the refined orbital models.

The ephemeris refinement system may be used to improve the accuracy of predicting collisions between target objects. When used to predict collisions, the ephemeris refinement system may receive initial collision predictions of target objects (e.g., from the JSpOC) that may occur within a collision window (e.g., 72-96 hours from the present), schedule the satellites to make observations of the target objects (e.g., collect images), refine the orbital models for the target objects based on the observations, and generate more accurate or refined predictions of collisions. Each satellite of the ephemeris refinement system (referred to in the following as simply "satellite") may include an imaging device that collects images and an on-board controller. The on-board controller receives from the ground-based controller a schedule for making observations at observation times and an observation orientation, orients the imaging device to the observation orientation, makes the observations (e.g., collects the images) in accordance with the schedule, and transmits information relating to the observations to the ground-based controller. The ground-based controller includes a scheduler, a communication interface, and a data analyzer. The scheduler generates a schedule for making observations within an observation window of the target objects from the satellites based on the initial collision predictions. The communication interface directs the transmission of the schedules to the satellites and receives from the satellites information relating to the observations. The communication interface may interface with a ground-based station that sends the schedules to the satellites via an upload link and receives the information from the satellites via a download link. The data analyzer generates refined orbital models for the target objects based on the received information and initial orbital modes and performs a conjunction analysis based on the refined orbital models for the collision window. Since the conjunction analysis is based on the refined orbital models that are presumed to be more accurate than the initial orbital models, the resulting collision predictions are likely to be more accurate, resulting in fewer false alarms. An operator of a target object that is predicted to collide can maneuver the target object to avoid the predicted collision.

The satellites of the ephemeris refinement system may be three-unit cube satellites ("CubeSats"). A CubeSat is a nanosatellite (e.g., 1 to 10 kilograms) that measures 10 centimeters on a side. The satellites include three CubeSat units attached end-to-end to form a 30×10×10 cm nanosatellite. In some embodiments, the satellites may be the 3U CubeSats developed as part of the Colony project of the U.S. National Reconnaissance Office. Each satellite includes an imaging device, an attitude control system, a power system, a global navigation satellite system ("GNSS") receiver, and an on-board controller. The satellites may be arranged into orbital groups with each satellite of an orbital group sharing the same orbital plane. For example, the 18 satellites may be arranged into three orbital groups of six satellites each. The satellites may be placed in a relatively low earth orbit for collecting images of target objects that are in higher orbit.

The ground-based controller includes a scheduler that generates schedules for the satellites to make observations. The scheduler is provided the orbital models of the satellites and the target objects and schedules observation time (i.e., start of observation and duration of observation) within an observation window when each satellite is available to make an observation of a target object. The scheduler uses the orbital models to identify, for each satellite, close approaches of the target objects to that satellite. For each close approach, the scheduler calculates viewing angles, an observation time, and an expected image quality for collecting an image of the target object. For each target object, the scheduler selects those close approaches with the highest expected image qualities as observation possibilities for that target object. The scheduler then adds to the schedule for each satellite those observation possibilities for that satellite with an observation time during which the satellite is available. The scheduler may also select observation possibilities for a target object with observation times that are closest to the start and the end of the observation window to ensure a longer orbital track for use in refining the orbital model.

Figure 1:
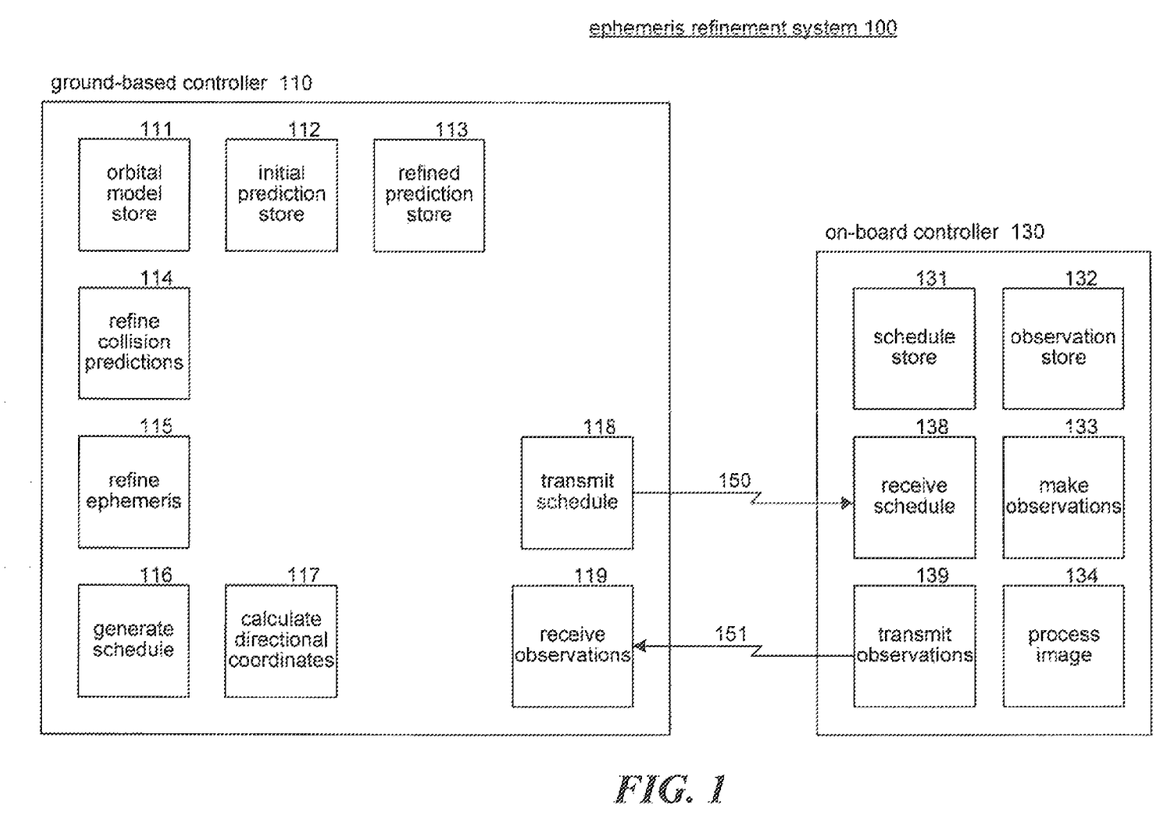
FIG. 1 is a block diagram that illustrates components of the ephemeris refinement system in some embodiments.

FIG. 1 is a block diagram that illustrates components of the ephemeris refinement system in some embodiments. The ephemeris refinement system 100 includes a ground-based controller 110 and satellites 130. The ground-based controller includes a target orbital model store 111, an initial prediction store 112, and a refined prediction store 113. The target orbital model store contains the orbital parameters of the orbital models for the target objects that have been identified as having a predicted collision within a collision window. The orbital parameters uniquely define the orbit of an object and may include eccentricity, semimajor axis, inclination, longitude, argument of periapsis, and mean anomaly parameters. The target orbital model store can be initialized with orbital models having relatively low accuracy from a publicly available catalog (e.g., NORAD Satellite Catalog). The ephemeris refinement system can then update those orbital models based on the refined orbital models to improve the subsequent performance of the system based on the more accurate orbital models. The initial prediction store contains the initial collision predictions of collisions that may occur within the collision window. The initial collision predictions identify the objects that may collide and may identify the time of the predicted collisions. The initial collision predictions may be provided by an organization such as the JSpOC. The refined prediction store contains the refined collision predictions.

The ground-based controller also includes a refine collision predictions component 114, a refine ephemeris component 115, a generate schedule component 116, a calculate directional coordinates component 117, a transmit schedule component 118, and a receive observations component 119. The refine collision predictions component refines the orbital models for the target objects that are predicted to collide and generates refined predictions based on refined ephemerides derived from the refined orbital models. The refine ephemeris component generates schedules for observations of target objects that have an initial collision prediction, transmits the schedules to the satellites, receives the corresponding observations from the satellites, refines the orbital models for the target objects, and generates the refined collision predictions that may occur within the collision window. Because the refined collision predictions are generated prior to the predicted collision, an operator of a target object has an action window during which to maneuver the target object to avoid the collision. The generate schedule component generates a schedule for each satellite that will be close enough to a target object to make an observation during the observation window. The calculate directional coordinates component calculates the directional coordinates for the target object of each observation. The transmit schedule component transmits the schedules for uploading to the satellites via an upload link 150. The receive observations component receives observations downloaded from the satellite via a download link 151.

The on-board controller of each satellite includes a schedule store component 131 and an observation store component 132. The schedule store component stores the schedules that are uploaded from the ground-based controller, and the observation store stores data derived from each observation. Each satellite also includes a make observations component 133, a process image component 134, a receive schedule component 138, and a transmit observations component 139. The make observations component orients the satellite to collect images in accordance with the uploaded schedules and collects other information that forms part of the observation such as time of start of exposure, duration of exposure, GNSS coordinates, satellite velocity, and so on. The process image component processes an image to identify endpoints of the streak of the target object within the images and the star positions (and positions of other stellar objects such as planets) within the image. The receive schedule component receives schedules from the ground-based controller via the upload link and stores them in the schedule store. The transmit observation component retrieves observations from the observation store and transmits them to the ground-based controller via the download link.

The computer system on which the ground-based controller may be implemented may be a multi-processor computer system with nodes, may include a central processing unit and memory, and may include input devices (e.g., keyboard and pointing devices), output devices (e.g., display devices), and storage devices (e.g., disk drives). Each node may include multiple processors and/or cores. The computer system on which the on-board controller is implemented may be a low power processor such as an ARM processor. Computer-readable media include computer-readable storage media and data transmission media. The computer-readable storage media are tangible media that include memory and other storage devices that may have recorded upon or may be encoded with computer-executable instructions or logic that implement the ground-based controller. The data transmission media is media for transmitting data using signals or carrier waves (e.g., electromagnetism) via a wire or wireless connection The ephemeris refinement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
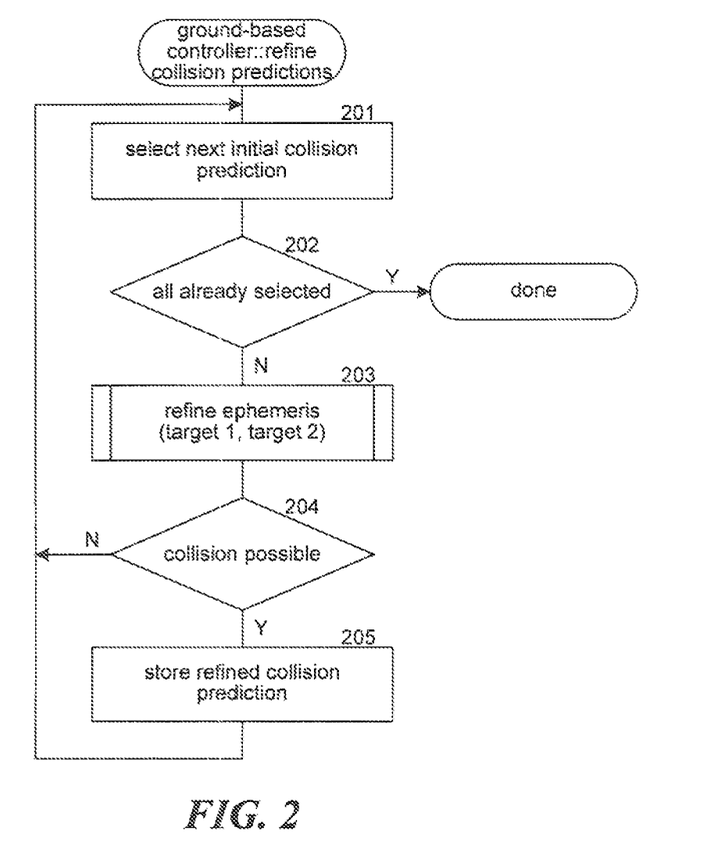
FIG. 2 is a flow diagram that illustrates the processing of the refine collision predictions component of the ground-based controller in some embodiments.

FIG. 2 is a flow diagram that illustrates the processing of the refine collision predictions component of the ground-based controller in some embodiments. The component controls the overall processing of the ground-based controller to refine the initial collision predictions by making observations of the target objects during an observation window, refining the orbital models of the target objects, and generating the refined predictions prior to an action window. The action window is a window in time during which a target object can be maneuvered to avoid a predicted collision. In block 201, the component selects the next initial collision prediction. In decision block 202, if all the initial collision predictions have already been selected, then the component completes, else the component continues at block 203. In block 203, the component invokes the refine ephemeris component passing an indication of the target objects of the selected initial collision prediction. In decision block 204, if the refined ephemerides of the target objects indicate that a collision is possible, then the component continues at block 205, else the component loops to block 201 to select the next initial collision prediction. In block 205, the component stores the refined collision prediction in the refined prediction store and then loops to block 201 to select the next initial collision prediction.

Figure 3:
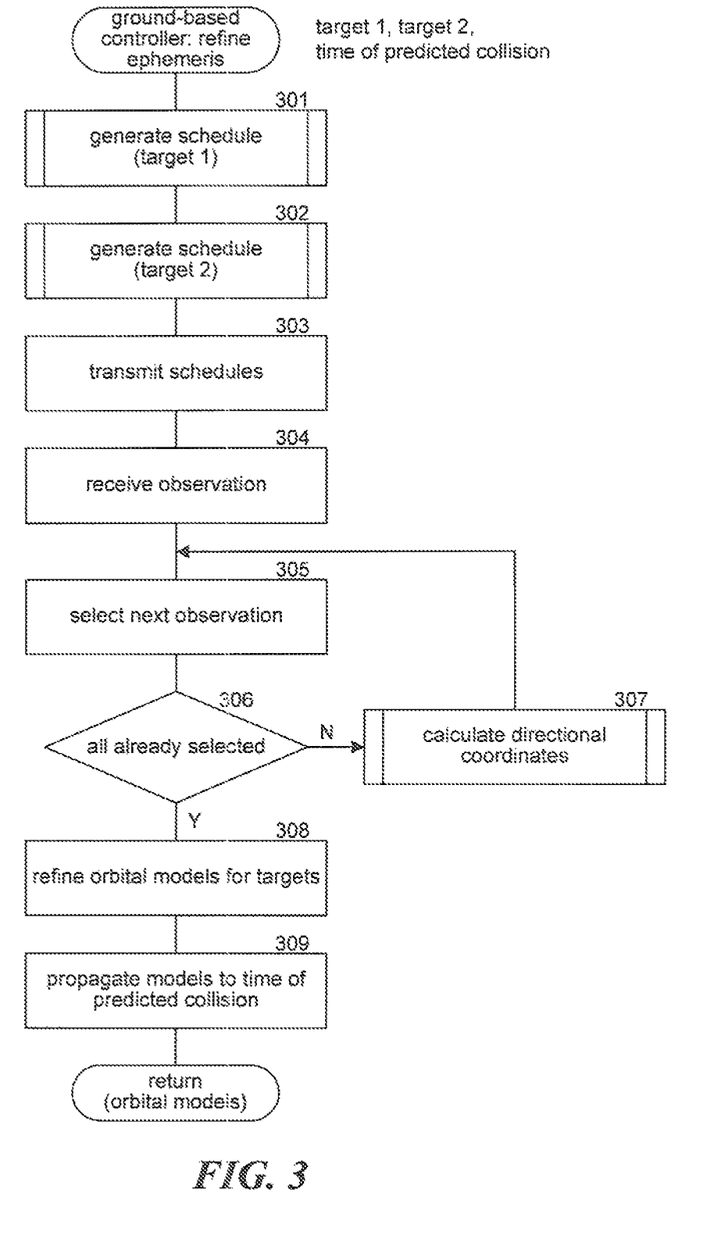
FIG. 3 is a flow diagram that illustrates the processing of the refine ephemeris component of the ground-based controller in some embodiments.

FIG. 3 is a flow diagram that illustrates the processing of the refine ephemeris component of the ground-based controller in some embodiments. The component is passed an indication of the target objects along with the time of their collision prediction. The component generates the observation schedules, uploads the schedules, downloads the observations, calculates the directional coordinates, refines the orbital models of the target objects, and refines the ephemerides of the target objects. The component is illustrated as transmitting schedules and receiving observations for each initial collision prediction. One skilled in the art would understand that the ground-based controller may generate the schedules of observations associated with all the initial collision predictions and then upload them to each satellite as a group. In block 301, the component invokes the generate schedule component passing an indication of the first target object. In block 302, the component invokes the generate schedule component passing an indication of the second target object. In block 303, the component transmits the generated schedules to the satellites. In block 304, the component receives the observations from the satellites. In blocks 305-307, the component loops calculating the directional coordinates of the target object for each of the observations. In block 305, the component selects the next observation. In decision block 306, if all the observations have already been selected, then the component continues at block 308, else the component continues at block 307. In block 307, the component invokes the calculate directional coordinates component passing the selected observation and loops to block 305 to select the next observation. In block 308, the component refines the orbital models for the targets. In block 309, the component propagates the orbital models to the time of the collision prediction to generate refined ephemerides for the target objects.

In some embodiments, the refine ephemeris component applies a sequential differential least squares approach to refine an orbital model for a target object. The component inputs information that is derived from a satellite catalog (e.g., the NORAD Satellite Catalog) that includes predicted orbital parameters (x) for the measurement epoch, a covariance matrix (P) for the predicted orbital parameters of the target object at the measurement epoch, predicted coordinates (e.g., right ascension and declination) (Z(x)) of the endpoint at the measurement epoch, and a numerically computed partial matrix (H=¶Z(x)/¶x). The component also inputs a covariance matrix (W) containing uncertainties in the measured coordinates of the endpoint due to attitude control stability, image noise and distortion, GNSS accuracy, and timing accuracy and the measured coordinates of the endpoint at the measurement epoch. The component then computes refined orbital parameters ($x_{new}$) and a covariance matrix ($P_{new}$) for the refined orbital parameters based on the measured coordinates of the target object as represented by the following equations.

$$\Delta z = z - Z(x) \quad (1)$$

$$\Delta x = (H^T W H + P^{-1})^{-1} (H^T W \Delta z) \quad (2)$$

$$x_{new} = x + \Delta x \quad (3)$$

$$P_{new}^{-1} = P^{-1} + H^T W H \quad (4)$$

This component applies the least squares approach to each endpoint of the observations for the target object in time sequence.

Figure 4:
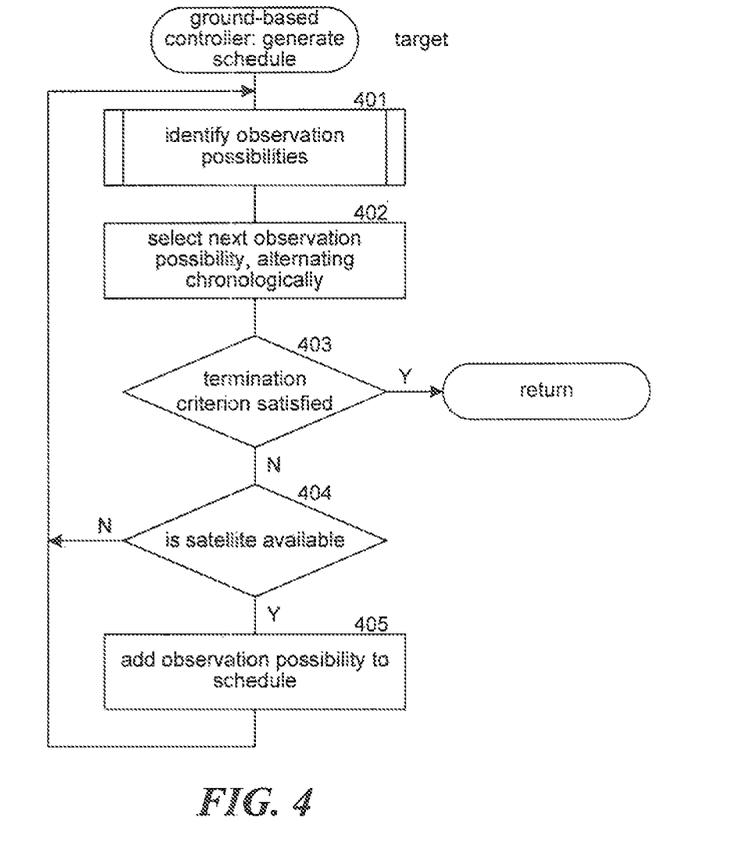
FIG. 4 is a flow diagram that illustrates the processing of the generate schedule component of the ground-based controller in some embodiments.

FIG. 4 is a flow diagram that illustrates the processing of the generate schedule component of the ground-based controller in some embodiments. The component is passed an indication of a target object and generates a schedule of observations for that target object. In block 401, the component invokes the identify observation possibilities component to identify opportunities to observe the target object during the observation window. In block 402, the component selects the next observation possibility by alternating the selection of the earliest and latest observation possibilities that have not yet been selected. For example, the component selects the earliest observation possibility, followed by the latest observation possibility, followed by the second earliest observation possibility, followed by the second latest observation possibility, and so on. By collecting observations at the earliest and latest possible times, the ephemeris refinement system may calculate more accurate orbital models than if the observations were clustered around the same time. In decision block 403, if a termination criterion is satisfied, then the component returns, else the component continues at block 404. The termination criterion may be that a certain number of observation possibilities have already been added to the schedule, that all the observation possibilities have already been added to the schedule, and so on. In decision block 404, if the satellite is available to make an observation at the observation time, then the component continues at block 405, else the component loops to block 402 to select the next observation possibility. A satellite may not be available to make an observation for a variety of reasons. For example, the satellite may not have ample time to orient the imaging device as needed, the satellite may be busy processing a previously collected image, and so on. As a satellite loses power, the time to orient the imaging device may increase. So the component may factor in the available power when estimating the time needed to orient the imaging device. A satellite may also be considered to not be available to make an observation if the satellite would not have an opportunity to download the observation to the ground-based controller in sufficient time to refine the orbit of the target object prior to the time of the predicted collision. The opportunity to download an observation depends in part on the number of ground stations for receiving observations and the communication viewing angle. In block 405, the component adds the selected observation possibility to the schedule for that satellite and then loops to block 402 to select the next observation possibility.

Figure 5:
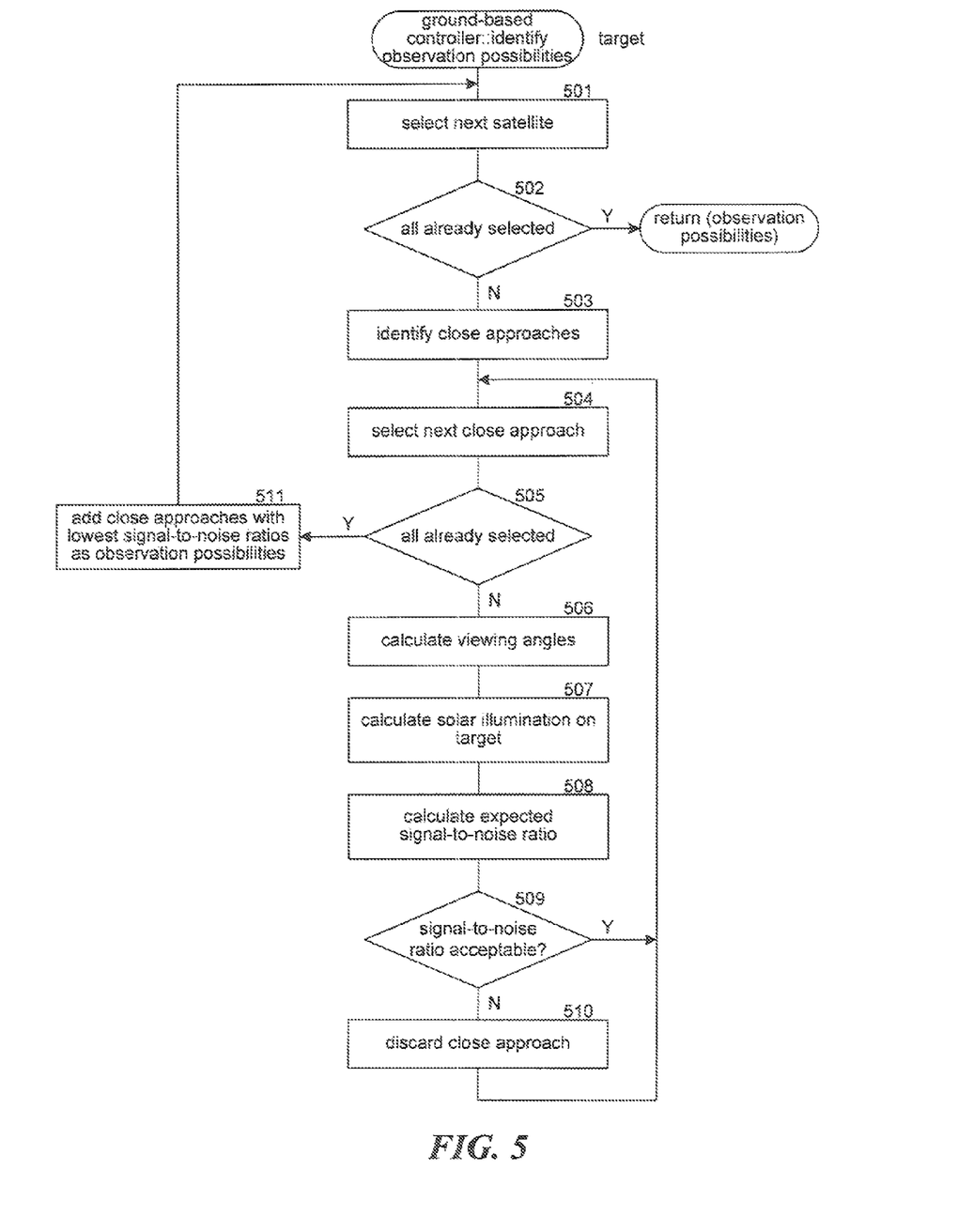
FIG. 5 is a flow diagram that illustrates the processing of the identify observation possibilities component of the ground-based controller in some embodiments.

FIG. 5 is a flow diagram that illustrates the processing of the identify observation possibilities component of the ground-based controller in some embodiments. The component is passed an indication of a target object and identifies observation possibilities for that target object. In block 501, the component selects the next satellite. In decision block 502, if all the satellites have already been selected, then the component returns the observation possibilities, else the component continues at block 503. In block 503, the component identifies the close approaches between the target object and the selected satellite that will occur within the observation window based on the orbital models from a satellite catalog. In block 504, the component selects the next close approach. In decision block 505, if all the close approaches have already been selected, then the component continues at block 511, else the component continues at block 506. In block 506, the component calculates the viewing angles between the satellite, the target object, and the sun based on their locations at the time of the close approach. In block 507, the component calculates the solar illumination of the target object. In block 508, the component calculates an expected signal-to-noise ratio of the observation as an indication of expected image quality. In decision block 509, if the signal-to-noise ratio is acceptable, then the component loops to block 504 to select the next close approach, else the component continues at block 510. In block 510, the component discards the selected close approach and then moves to block 504 to select the next close approach. In block 511, the component adds the close approaches with the lowest signal-to-noise ratios as observation possibilities for the selected satellite and then loops to block 501 to select the next satellite. In some embodiments, the component may schedule multiple observations each right after the other to help ensure that the target object is not missed as a result of the uncertainty in the initial orbital model. For example, the component may schedule five observations before and five observations after the expected time of a close approach. The component may also calculate a duration of an observation to ensure that enough light is collected from the stars for accurate detection of the stars and to ensure that one end point of the streak of the target object appears in at least one image of the observations.

Figure 6:
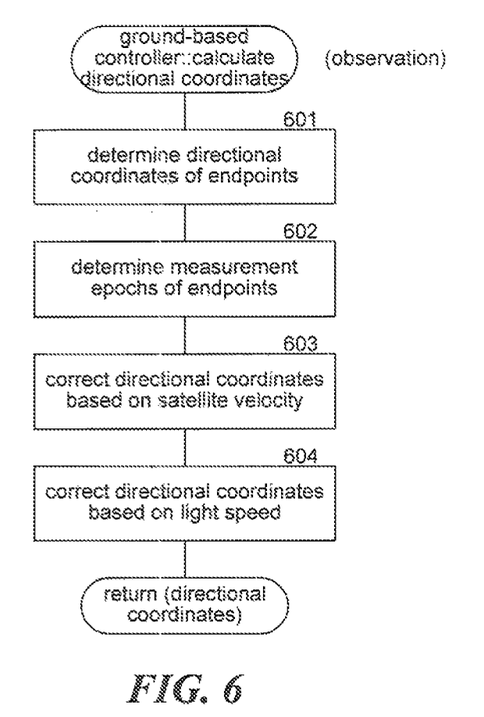
FIG. 6 is a flow diagram that illustrates the processing of the calculate directional coordinates component of the ground-based controller in some embodiments.

FIG. 6 is a flow diagram that illustrates the processing of the calculate directional coordinates component of the ground-based controller in some embodiments. The component is passed an observation (e.g., star positions and endpoint positions) and GNSS information for the satellite that made the observation. The GNSS information may include X, Y, Z position components and $V_x$, $V_y$, $V_z$ velocity components and standard deviations for the position and velocity components. The component also inputs information derived from a satellite catalog and a star catalog. The component generates the directional coordinates of the endpoints of the observation that are corrected to take into consideration the satellite speed and light speed. In block 601, the component calculates the directional coordinates of the endpoints of the streak of the passed observation. The component estimates the right ascension and the declination of the endpoints from an estimation of the orientation of the imaging device by matching the star positions of the observation against the star positions of the star catalog. In block 602, the component determines the measurement epochs of the endpoints. The component calculates the measurement epochs using the exposure start time and duration and information from the satellite catalog indicating the direction of the streak at the time of observation. In block 603, the component corrects the directional coordinates based on the velocity of the satellite. The component corrects for special relativistic aberrations due to the velocity of the satellite with respect to the barycenter of the solar system. This aberration causes the stars to be at aberrated directional coordinates rather than their cataloged directional coordinates. In block 604, the component corrects the directional coordinates of the endpoints based on the speed of light. The component then returns the directional coordinates.

Figure 7:
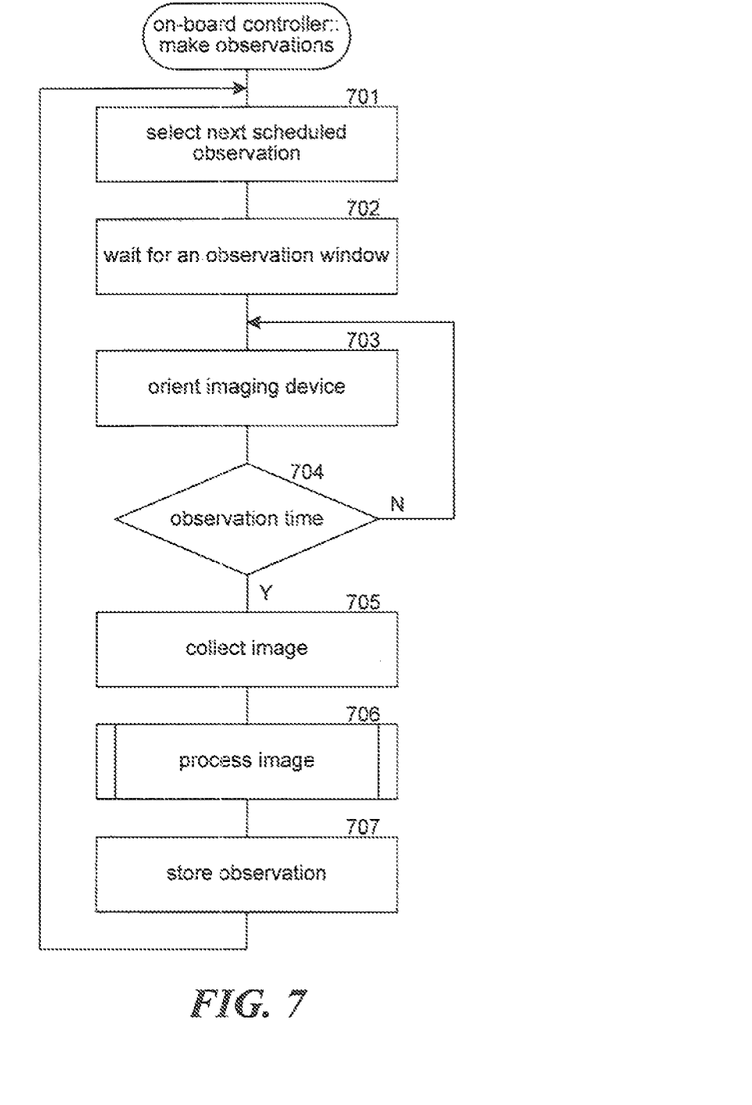
FIG. 7 is a flow diagram that illustrates the processing of the make observations component of the on-board controller in some embodiments.

FIG. 7 is a flow diagram that illustrates the processing of the make observations component of the on-board controller in some embodiments. The component loops selecting the next scheduled observation, orienting the imaging device, collecting the image, and storing the observation in the observation store. In block 701, the component selects the next scheduled observation of the schedule store. In block 702, the component may wait for an orientation window, during which time the satellite starts the process of orienting the imaging device. In block 703, the component starts the process of orienting the imaging device. In decision block 704, if the current time is the observation time, then the component continues at block 705, else the component loops to block 703 to continue with the orientation of the imaging device. To orient the imaging device, the component collects images to determine the orientation based on the star positions of the collected image and the star position of a star catalog. The component may continually reorient the imaging device as external forces such as solar winds may change the orientation. In block 705, the component collects the image. In block 706, the component invokes the process image component to process the collected image. In block 707, the component stores the observation information derived from the processed image along with location and velocity information into the observation store and then loops to block 701 to select the next scheduled observation for the satellite.

Figure 8:
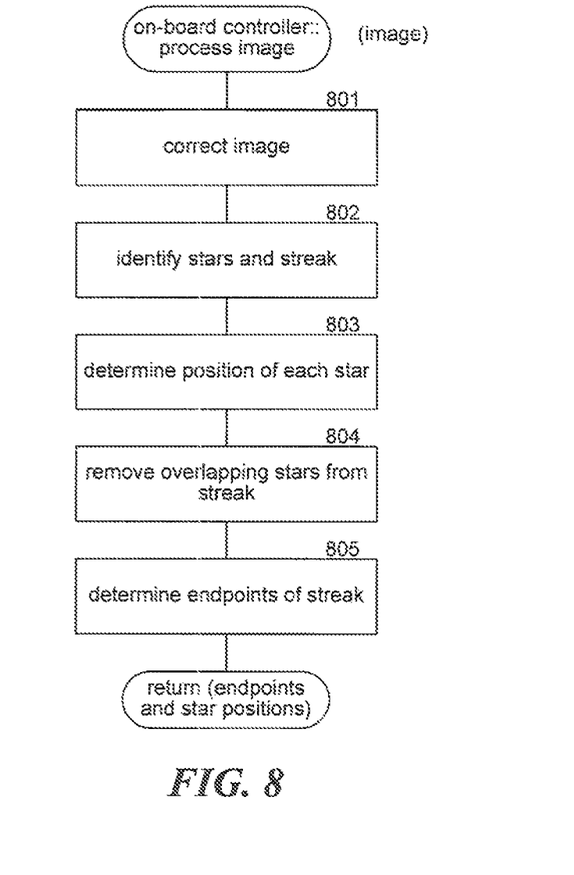
FIG. 8 is a flow diagram that illustrates the processing of the process image component of the on-board controller in some embodiments.

FIG. 8 is a flow diagram that illustrates the processing of the process image component of the on-board controller in some embodiments. The component is passed an image and identifies the endpoints of the streak and the star positions. In block 801, the component corrects the image by performing a sky image subtraction, a flat field correction, and a bad pixel interpolation. In block 802, the component identifies the streak and the stars within the image. For example, the component may search for contiguous pixels that are above a threshold value and then classify the contiguous pixels based on ellipticity and the number of contiguous pixels. The component may also perform edge tracing to identify the pixels that belonged to a streak. In block 803, the component determines the position of each star by, for example, the centroid of the contiguous pixels that were identified as a star. In block 804, the component eliminates contamination in the streak from any overlapping stars, which may include an intensity weighted linear fit to the streak and the clipping of pixels that lie too far away from the streak. In block 805, the component determines the endpoints of the streak by applying a match filter that convolves a filter with the streak and changes the link to the filter until it matches the streak. The component then returns the locations of the endpoints and the star positions.

From the foregoing, it will be appreciated that specific embodiments of the invention have been described herein for purposes of illustration but that various modifications may be made without deviating from the scope of the invention. For example, even though the ground-based controller is described as being "ground-based" and the on-board controller is described as being "on-board," the functions performed by the controller can be distributed among controllers that can be ground-based, space-based, on-board; and/or off-board. For example, depending on the processing power of the satellites, the on-board controller may generate its own schedules for making observations. Also, depending on the bandwidth of the communications links, the raw collected images could be downloaded to an off-board controller for further processing. In such a case, the off-board controller (e.g., the ground-based controller), rather than the on-board controller would perform the processing of the process image component. Accordingly, the invention is not limited except as by the appended claims.

We claim:

1. A system for generating a schedule for monitoring target objects that are in earth orbit via a network of satellites having imaging devices for collecting images, the system comprising:
   a storage medium storing computer-executable instructions of:
      a component that receives collision predictions for the target objects that may collide;
      a component that identifies close approaches of the target objects that may collide to satellites;
      a component that, for each close approach of a target object to a satellite, determines viewing angles, a collection time, and an expected image quality for collecting an image of the target object by the satellite; and
      a component that, for each satellite, adds to a schedule for that satellite a scheduled observation indicating orientation of the imaging device and collection time for close approaches to that satellite when the expected image quality satisfies an image quality criterion; and
   a processor for executing the computer-executable instructions stored in the storage medium.

2. The system of claim 1 wherein the identified close approach of a target object to a satellite is within a collection window that is prior to a predicted collision time for that target object.

3. The system of claim 1 wherein the expected image quality is represented by a signal-to-noise ratio that factors in solar illumination and viewing angle for the target objects.

4. The system of claim 1 wherein scheduled observations are added to schedules for satellites factoring in whether the satellites are available at the collection time of a close approach.

5. The system of claim 1 including a component that sends the schedules to a transmit device for transmitting the schedules to the satellites.

6. The system of claim 1 wherein the storage medium further stores computer-executable instructions of a component that directs transmission to the satellites of the schedules and receives from the satellites information relating to observations of the target objects.

7. The system of claim 2 wherein scheduled observations for a target object are added to schedules to maximize difference in collection times for images of that target object.

8. The system of claim 4 wherein a satellite is not available when the imaging device of that satellite cannot be oriented as required by the observation.

9. The system of claim 6 wherein the storage medium further stores computer-executable instructions of a component that generates refined orbital models for the target objects based on the received information derived from the observations and initial orbital models and generates a refined collision prediction using the refined orbital models.

10. The system of claim 7 wherein the number of scheduled observations for each target object is less than a threshold number.

11. A computer-readable storage medium that is not a transitory, propagating signal, the computer-readable storage medium containing computer-executable instructions for controlling a computing device to generate a schedule for collecting images of target objects in earth orbit that may collide via a network of satellites having imaging devices for collecting images, the computer-executable instructions when executed by the computing device perform a method comprising:
for each satellite,
identifying close approaches of the target objects to that satellite;
for each close approach of a target object to that satellite, determining viewing angles, a collection time, and an expected image quality for collecting an image of the target object by that satellite;
selecting as observation possibilities for that satellite the close approaches with the highest expected image qualities; and
adding to the schedule for that satellite as scheduled observations the observation possibilities with a collection time during which that satellite is available.

12. The computer-readable storage medium of claim 11 wherein the selecting includes selecting only the observation possibilities with an expected image quality that satisfies an image quality criterion.

13. The computer-readable storage medium of claim 11 wherein the identified close approach of a target object to a satellite is within a collection window that is prior to a time of a predicted collision for the target object.

14. The computer-readable storage medium of claim 11 wherein scheduled observations for a target object are added to schedules to maximize difference in collection times for images of that target object.

15. The computer-readable storage medium of claim 11 wherein the expected image quality is represented by a signal-to-noise ratio that factors in solar illumination of the target object and angles between the satellite, the sun, and the target object.

16. The computer-readable storage medium of claim 11 wherein a satellite is not available when the imaging device of that satellite cannot be oriented to the required orientation by the collection time.

17. The computer-readable storage medium of claim 14 wherein the number of scheduled observations for each target object is less than a threshold number.

18. A method performed by a computing system for generating a schedule for collecting images of target objects in earth orbit that have been identified as having a possibility of colliding with other target objects, the images being collected via a network of satellites having imaging devices, the method comprising:
storing an indication of the target objects that have been identified as having a possibility of colliding with other target objects;
identifying by the computing system close approaches of the target objects to the satellites; and
for each close approach of a target object to a satellite,
determining by the computing system an imaging device orientation, a collection time, and an expected image quality for collecting an image of the target object by the satellite; and
adding by the computing system to the schedule of that satellite a scheduled observation indicating the imaging device orientation and collection time for the close approach when the expected image quality satisfies an image quality criterion.

19. The method of claim 18 wherein scheduled observations for a target object are added to schedules to maximize difference in collection times for images of that target object.

20. The method of claim 18 wherein the expected image quality is represented by a signal-to-noise ratio that factors in solar illumination of the target objects.

21. The method of claim 18 wherein scheduled observations are added to schedules for satellites factoring in whether the satellites are available at the collection time of a close approach.

22. The method of claim 21 wherein a satellite is not available when the imaging device of that satellite cannot be properly oriented at the collection time of the close approach.

* * * * *